(12) United States Patent
Choi

(10) Patent No.: US 9,376,081 B2
(45) Date of Patent: Jun. 28, 2016

(54) AIRBAG DEVICE FOR VEHICLE

(71) Applicants: Hyundai Motor Company, Seoul (KR); Kia Motors Corp., Seoul (KR)

(72) Inventor: Jun Yeol Choi, Seoul (KR)

(73) Assignees: Hyundai Motor Company, Seoul (KR); Kia Motors Corp., Seoul (KR)

(*) Notice: Subject to any disclaimer, the term of this patent is extended or adjusted under 35 U.S.C. 154(b) by 0 days.

(21) Appl. No.: 14/550,968

(22) Filed: Nov. 22, 2014

(65) Prior Publication Data

US 2016/0052478 A1 Feb. 25, 2016

(30) Foreign Application Priority Data

Aug. 20, 2014 (KR) .................. 10-2014-0108357

(51) Int. Cl.
*B60R 21/216* (2011.01)
*B60R 21/2338* (2011.01)
*B60R 21/239* (2006.01)

(52) U.S. Cl.
CPC ............. *B60R 21/216* (2013.01); *B60R 21/239* (2013.01); *B60R 21/2338* (2013.01); *B60R 2021/23382* (2013.01)

(58) Field of Classification Search
CPC B60R 21/216; B60R 21/2338; B60R 21/239; B60R 2021/23382
See application file for complete search history.

(56) References Cited

U.S. PATENT DOCUMENTS

| | | | | |
|---|---|---|---|---|
| 7,607,690 B2* | 10/2009 | Abe | ............... | B60R 21/231 280/739 |
| 8,070,183 B2* | 12/2011 | Kumagai | ............ | B60R 21/2338 280/732 |
| 8,678,431 B2* | 3/2014 | Fischer | ............... | B60R 21/2338 280/739 |
| 8,684,404 B2* | 4/2014 | Fischer | ............... | B60R 21/2338 280/739 |
| 8,696,022 B2* | 4/2014 | Fischer | ............... | B60R 21/2338 280/739 |
| 8,870,223 B2* | 10/2014 | Choi | ............... | B60R 21/2338 280/739 |
| 9,108,590 B2* | 8/2015 | Williams | ............... | B60R 21/239 |
| 2008/0007038 A1* | 1/2008 | Fischer | ............... | B60R 21/233 280/743.2 |
| 2010/0001498 A1* | 1/2010 | Abe | ............... | B60R 21/2338 280/739 |
| 2010/0102542 A1* | 4/2010 | Nakajima | ............. | B60R 21/233 280/743.2 |
| 2010/0133798 A1* | 6/2010 | Fukawatase | ........ | B60R 21/2338 280/743.2 |
| 2011/0133437 A1* | 6/2011 | Jang | ..................... | B60R 21/2338 280/743.2 |
| 2012/0153603 A1* | 6/2012 | Mallinger | ............. | B60R 21/239 280/739 |
| 2012/0280477 A1* | 11/2012 | Young | ................. | B60R 21/2338 280/739 |
| 2012/0306187 A1* | 12/2012 | Mendez | ............. | B60R 21/2338 280/743.2 |

(Continued)

FOREIGN PATENT DOCUMENTS

KR 10-2004-0043829 A 5/2004
KR 10-2005-0076044 A 7/2005

(Continued)

*Primary Examiner* — Joseph Rocca
*Assistant Examiner* — Timothy Wilhelm
(74) *Attorney, Agent, or Firm* — Morgan, Lewis & Bockius LLP

(57) ABSTRACT

An airbag device for a vehicle may include a main vent hole formed in an airbag cushion and configured to discharge an expanding gas therein, a cover provided to an outer side of the airbag cushion and configured to switch between a state in which the cover is spaced apart from the main vent hole by a given tensile force to open the main vent hole and a state in which the cover is closely adhered to the main vent hole to close the main vent hole, a tether configured to have one end portion connected to the cover and another end portion fixed in the airbag cushion and provide the tensile force to the cover through the main vent hole, and a tether guide.

9 Claims, 7 Drawing Sheets

(56) References Cited

U.S. PATENT DOCUMENTS

2013/0134697 A1* 5/2013 Choi .................. B60R 21/239
                                                    280/743.2
2013/0147171 A1   6/2013 Shin et al.

FOREIGN PATENT DOCUMENTS

| KR | 10-2013-0058985 A | 6/2013 |
| KR | 10-2014-0083334 A | 7/2014 |

\* cited by examiner

AIRBAG DEVICE FOR VEHICLE

CROSS REFERENCE TO RELATED APPLICATION

The present application claims priority to Korean Patent Application No. 10-2014-0108357, filed Aug. 20, 2014, the entire contents of which is incorporated herein for all purposes by this reference.

BACKGROUND OF THE INVENTION

1. Field of the Invention

The present invention relates to an airbag, and more particularly, to an airbag device for a vehicle capable of performing a rapid deploying operation at the time of initially deploying an airbag cushion and exhibiting appropriate buffering performance at the time of loading a passenger, and also improving deploying performance of the airbag cushion by increasing operability of a tether.

2. Description of Related Art

Since an airbag buffers a shock of the passengers by an appropriate inflation of an airbag cushion in case of accident of a vehicle to thereby reduce or prevent injury of the passengers, an inflation behavior of the airbag cushion plays an important role in securing safety of the passengers.

Particularly, the required inflation behavior of the airbag cushion should rapidly constrain the passengers by a rapid inflation upon an initial deploying operation of the airbag cushion and may appropriately buffer the passengers by appropriately discharging an expanding gas in the airbag cushion upon a loading at which the passenger is in contact with the airbag cushion and applies his/her load to the airbag cushion.

In addition, for example, requirements required from various regulations such as low risk deployment (LRD) regulations of North America, and the like should be satisfied. In case of the LRD regulations, it is required to minimize an injury of children or the passengers positioned in the vicinity of an airbag device by allowing the expanding gas to be discharged through a vent hole even at the time of the initial deploying operation of the airbag cushion and hereinafter, performance for satisfying the above-mentioned LRD regulations is referred to as LRD performance.

However, in order to satisfy the LRD performance as described above, even at the time of the initial deploying operation of the airbag cushion, the vent hole of the airbag cushion should be opened so that a portion of the expanding gas may be discharged, the vent hole should be closed at the time of the initial deploying operation of the airbag cushion, if possible, in order to rapidly expand the airbag cushion as described above, and the vent hold should be opened to allow the expanding gas to be discharged once the airbag cushion is fully deployed and the passenger starts to be loaded. As described above, it was difficult to implement the vent hole so as to be appropriately opened or closed at an appropriate timing depending on a progress of the deploying process of the airbag cushion and seating conditions of the passenger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an airbag device for a vehicle capable of satisfying low risk deployment (LRD) performance for reducing an injury of a children or a passenger positioned in the vicinity of the air bag device while performing a rapid deploying operation at the time of initially deploying an airbag cushion and exhibiting appropriate buffering performance at the time of loading the passenger.

Additionally, various aspects of the present invention are directed to providing an airbag device for a vehicle capable of improving deploying performance of an airbag cushion by increasing operability of a tether.

According to various aspects of the present invention, an airbag device for a vehicle may include a main vent hole formed in an airbag cushion and configured to discharge an expanding gas therein, a cover provided to an outer side of the airbag cushion and configured to switch between a state in which the cover is spaced apart from the main vent hole by a given tensile force to open the main vent hole and a state in which the cover is closely adhered to the main vent hole to close the main vent hole, a tether configured to have one end portion connected to the cover and another end portion fixed in the airbag cushion and provide the tensile force to the cover through the main vent hole, and a tether guide configured to have an edge fixed on an inner side of the airbag cushion to form a space between the tether guide and the airbag cushion and to slide in a state in which the tether passes through the tether guide and is supported.

The airbag device may further include a closed guide provided between the main vent hole and the tether guide to support the tether and configured so that the tether passing through the tether guide slides on the inner side of the airbag cushion and passes through the inner side of the airbag cushion.

The cover may be provided with an auxiliary vent hole to discharge the expanding gas in the airbag cushion, and the auxiliary vent hole may be positioned on an inner side or an outer side of the main vent hole in a state in which the cover closes the main vent hole.

The cover may have a portion adhered to the airbag cushion to enclose the main vent hole and remaining portions which are opened, and may be configured together with an outer side of the airbag cushion, to form an outlet having a pocket shape discharging the expanding gas discharged from the main vent hole into an atmosphere.

The main vent hole may be formed in a side surface of the airbag cushion and the tether guide may be installed in an inner side of a portion of the airbag cushion that a head of a passenger is in contact with.

An outer surface of the airbag cushion to which the tether guide is fixed may be deployed in a state in which the outer surface of the airbag cushion to which the tether guide is fixed protrudes to the passenger as compared to an outer surface of the airbag cushion therearound.

The tether may include a first portion connecting a front and a rear of the airbag cushion and a second portion extended to a side of the airbag cushion and connected to the cover, and the tether guide may be provided with a first guide hole through which the first portion of the tether passes and a second guide hole through which the second portion of the tether passes, such that the tether may slide while passing through a space between the tether guide and the airbag cushion through the first guide hole and the second guide hole.

The other end portion of the tether may be fixed on the front of the airbag cushion and a middle end portion of the tether slides while passing through the first guide hole and the second guide hole, such that the tensile force provided to the cover may be released by a change in a relative length of the first portion and the second portion of the tether when a head of the passenger is in contact with the airbag cushion to thereby switch the main vent hole to an opened state.

The tether guide may have an edge formed in a circular shape and may be sewed on the inner side of the airbag cushion.

The airbag device may further include a shape maintaining tether having front and rear ends, and both the front and rear ends may be fixed in the airbag cushion and regulating a deployed shape of the airbag cushion, in which a front end portion of the shape maintaining tether may be fixed to a front of the airbag cushion together with the other end portion of the tether.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
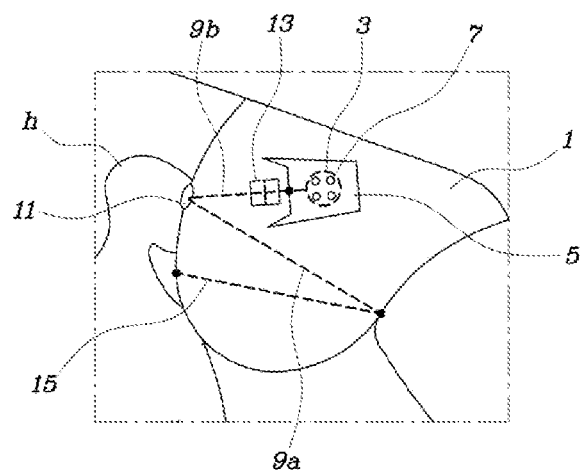
FIG. 1A and FIG. 1B are views showing a structure having a main vent hole which is closed by a tether at a time of an initial deployment operation of an exemplary airbag device according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An airbag device for a vehicle according to the present invention may be configured to generally include a main vent hole 3, a cover 5, a tether 9, and a tether guide 11.

Describing a configuration of the airbag device according to the present invention with reference to FIG. 1A, FIG. 1B, FIG. 2, FIG. 3A, FIG. 3B, FIG. 4A and FIG. 4B in detail, the airbag device is configured to include a main vent hole 3 formed in an airbag cushion 1 and configured to discharge an expanding gas therein, a cover 5 provided to an outer side of the airbag cushion 1 and configured to switch between a state in which the cover 5 is spaced apart from the main vent hole 3 by given tensile force to open the main vent hole 3 and a state in which the cover 5 is closely adhered to the main vent hole 3 to close the main vent hole 3, a tether 9 configured to have one end portion connected to the cover 5 and the other end portion fixed in the airbag cushion 1 and provide the tensile force to the cover 5 through the main vent hole 3, and a tether guide 11 configured to have an edge fixed on an inner side of the airbag cushion 1 to form a space between the tether guide 11 and the airbag cushion 1 and to slide in a state in which the tether 9 passes through the tether guide 11 and is supported.

Here, the airbag cushion 1 may be the airbag cushion 1 which is deployed from a front of a passenger-side seat of a front seat.

In addition, the airbag device may be configured to further include a closed guide 13 provided between the main vent hole 3 and the tether guide 11 to support the tether 9 and configured so that the tether 9 passing through the tether guide 11 slides on the inner side of the airbag cushion 1 and passes through the inner side of the airbag cushion 1.

That is, immediately after an initial deployment operation of the airbag cushion 1, the cover 5 blocks the main vent hole 3 to allow the airbag cushion 1 to be rapidly deployed, and once the passenger is loaded on the airbag cushion 1, the cover 5 is opened and opens the main vent hole 3 to allow the passenger to be appropriately buffered and rapidly discharge a gas in the airbag cushion 1.

Particularly, the edge of the tether guide 11 is fixed on the inner side of the airbag cushion 1 to thereby form the space between the tether guide 11 and the airbag cushion 1. As a result, since an operation space of the tether 9, which passes through the space and slides, becomes wide, operability of the tether 9 is improved. Therefore, since a length of the tether 9 is more smoothly changed at the time of deploying the airbag cushion 1, open/close operation performance of the cover 5 is also improved and as a result, deploying performance of the airbag cushion 1 is improved.

Meanwhile, according to the present invention, an auxiliary vent hole 7 may be further formed in the cover 5 so as to discharge the expanding gas in the airbag cushion 1.

That is, at the time of the initial deployment operation of the airbag cushion 1, the auxiliary vent hole 7 formed in the cover 5 prevents pressure in the airbag cushion 1 from being excessively increased, and once the passenger is loaded on the airbag cushion 1, the gas in the airbag cushion 1 is rapidly discharged by the auxiliary vent hole 7 together with the main vent hole 3 which is opened by an open operation of the cover 5.

Figure 7A:
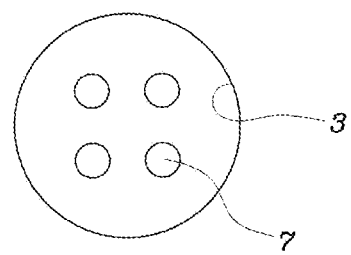
FIG. 7A.
Figure 7B:
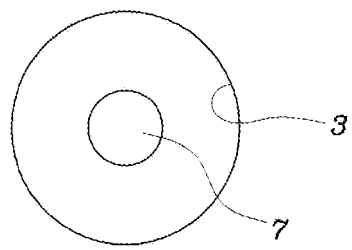
FIG. 7B and FIG. 7C are views showing auxiliary vent holes formed in an inner side of a main vent hole in the exemplary airbag device according to the present invention.
Figure 7C:
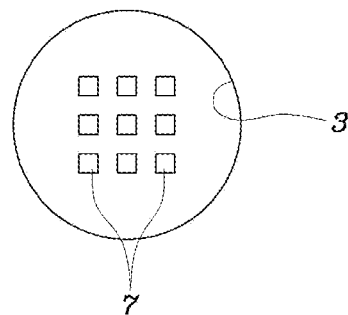

For example, as a preferred example of the auxiliary vent hole 7, referring to FIG. 7A, FIG. 7B and FIG. 7C, the auxiliary vent hole 7 may be formed to be positioned in the inner side of the main vent hole 3 in a state in which the cover 5 closes the main vent hole 3.

That is, in the case in which the auxiliary vent hole 7 is positioned in the inner side of the main vent hole 3, at the time of deploying the airbag cushion 1, since the cover 5 blocks the main vent hole 3 to allow the airbag cushion 1 to be rapidly deployed and the gas in the airbag cushion 1 is also discharged through the auxiliary vent hole 7, the auxiliary vent hole 7 positioned in the inner side of the main vent hole 3 prevents inner pressure of the airbag cushion 1 from being excessively increased to thereby prevent damage on the airbag cushion 1, is more advantageous to LRD performance due to a continuous gas discharge through the auxiliary vent hole 7, and is very useful when the gas in the airbag cushion 1 needs to be continuously discharged.

Figure 8A:
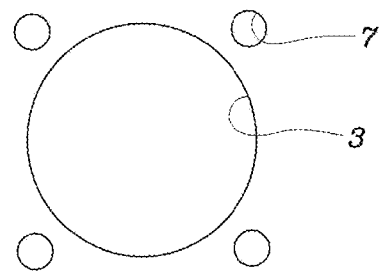
FIG. 8A.
Figure 8B:
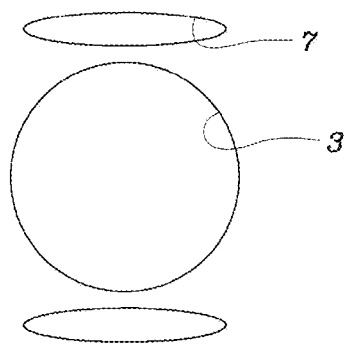
FIG. 8B and FIG. 8C are views showing the auxiliary vent holes formed in an outer side of the main vent hole in the exemplary airbag device according to the present invention.
Figure 8C:
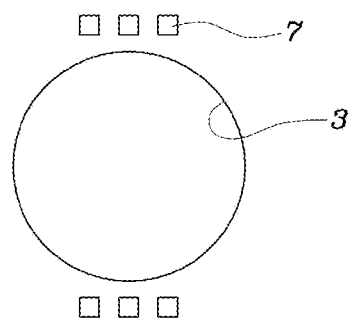

In addition, as another example of the auxiliary vent hole 7, referring to FIG. 8A, FIG. 8B and FIG. 8C, the auxiliary vent hole 7 may be formed to be positioned in the outer side of the main vent hole 3 in a state in which the cover 5 closes the main vent hole 3.

That is, in the case in which the auxiliary vent hole 7 is positioned in the outer side of the main vent hole 3, the gas discharged through the auxiliary vent hole 7 is minimized at the time of deploying the airbag cushion 1 to thereby allow the airbag cushion 1 to be more rapidly deployed and an area of the cover 5 obstructing the discharge of the gas in the case in which the gas is discharged through the main vent hole 3 at the time of loading the passenger is also minimized, the auxiliary vent hole 7 positioned in the outer side of the main vent hole 3 is advantageous to buffering performance of the passenger and LRD performance.

Figure 5:
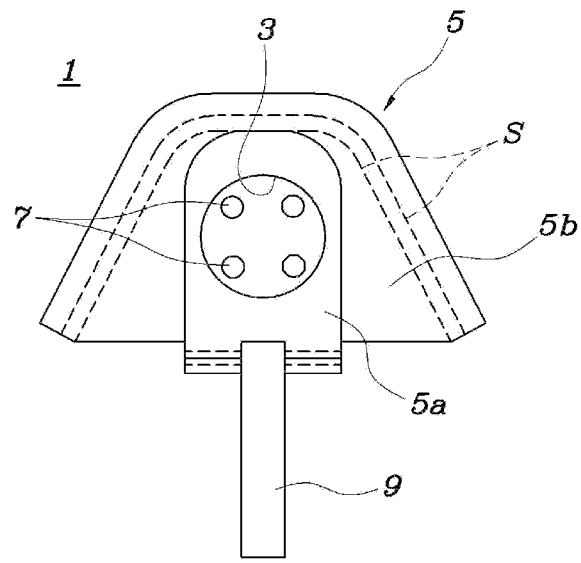
FIG. 5 is a view showing a cover shape of the exemplary airbag device according to the present invention.

Meanwhile, as shown in FIG. 5, the cover 5 has a portion adhered to the airbag cushion 1 to enclose the main vent hole 3 and the remaining portions which are opened, and may be configured to form an outlet having a pocket shape allowing the expanding gas discharged from the main vent hole 3 to be discharged into the atmosphere, together with the outer side of the airbag cushion 1.

Here, the cover 5 may be sewed in the airbag cushion 1 by a dual sewing line (s).

Particularly, since a corner portion of the cover 5 is formed to be rounded in a curve shape, it prevents the gas discharged from the airbag cushion 1 at the time of opening the cover 5 from remaining in an inner side of the corner portion, thereby smoothing operability of the cover 5 and also preventing damage on the cover 5 due to excessive gas concentration.

Describing a structure of the cover 5 in more detail, a main part 5a having a rectangular shape may be formed to have a size capable of covering the main vent hole 3, a side part 5b may be formed to be extended from a front end and both side ends of the main part 5a, and a space allowing the main part 5a to be spaced apart from a surface of the airbag cushion 1 by a spreading of the side part 5b may be formed.

In addition, a front end and both side ends of the side part 5b extended from the main part 5a may enclose the main vent hole 3 and be directly adhered to the airbag cushion 1, a corner portion between the front end and the both side ends of the main part 5a, and a corner portion between the front end and the both side ends of the side part 5b may be formed in the curve shape having a predetermined radius, and a rear end of the side part 5b may be spaced apart from the airbag cushion 1 in a free state and may be opened.

Here, the side part 5b may implement a three dimensional (3D) shape when the cover 5 is opened and may be provided in a folded state in order to easily perform an assembly and a specification change.

Meanwhile, referring to FIG. 1A, FIG. 1B, FIG. 2, FIG. 3A, FIG. 3B, FIG. 4A and FIG. 4B, the present invention has a structure in which the main vent hole 3 is formed in the side surface of the airbag cushion 1 and the tether guide 11 is installed in an inner side of a portion that a head h of the passenger is in contact with the airbag cushion 1.

Particularly, a portion of the airbag cushion 1 to which the tether guide 11 is fixed may be configured to be deployed in a state in which it protrudes to the passenger as compared to a portion of the airbag cushion 1 therearound.

That is, since a setting portion of the tether guide 11 is deployed in a state in which it protrudes to the passenger as compared to other surfaces, the space between the inner side of the tether guide 11 and the inner side of the airbag cushion 1 becomes wider, such that operability of the tether 9 is improved and the length of the tether 9 is more smoothly changed, thereby improving deploying performance of the airbag cushion 1.

In addition, the tether 9 may be described by dividing it into a first portion 9a connecting a front and a rear of the airbag cushion 1 and a second portion 9b extended to a side of the airbag cushion 1 and connected to the cover 5, based on the tether guide 11.

In addition, the tether guide 11 is provided with a first guide hole 11a through which the first portion 9a passes and a second guide hole 11b through which the second portion 9b passes, such that the tether 9 slides while passing through the first guide hole 11a and the second guide hole 11b.

Figure 6:
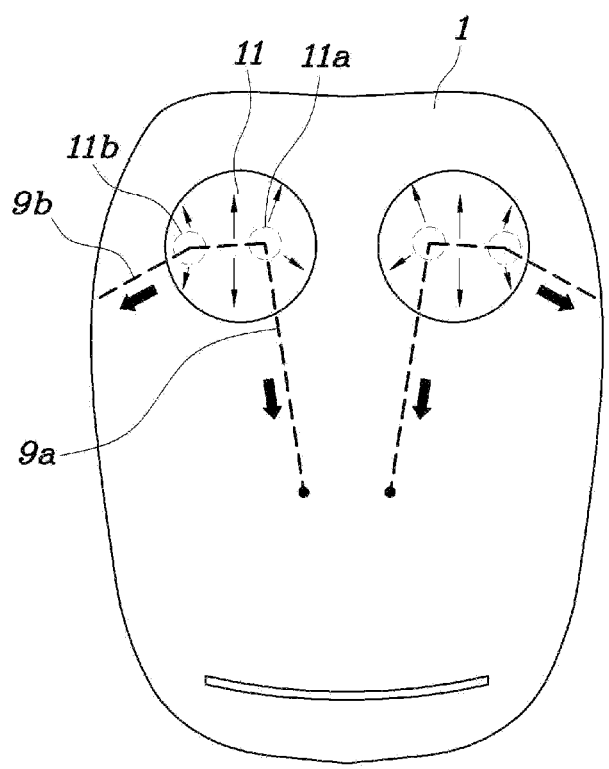
FIG. 6 is a view for describing a shape and a force dispersing action of a tether guide in the exemplary airbag device according to the present invention.

In addition, as shown in FIG. 6, the first guide hole 11a and the second guide hole 11b may be formed in a circular shape and may be formed in consideration of a direction in which the tether 9 slides. That is, the first guide hole 11a and the second guide hole 11b may be respectively formed in a forward direction in which the tether 9 slides so that the tether guide 11 is not twisted at the time of the sliding of the tether 9.

Particularly, the other end portion of the tether 9 is fixed on the front of the airbag cushion 1 and a middle end portion of the tether 9 slides while passing through the space between the tether guide 11 and the airbag cushion 1 through the first guide hole 11a and the second guide hole 11b.

Therefore, since the tensile force provided to the cover 5 is released by changes in the pressure of the expanding gas in the airbag cushion 1 and a relative length of the first portion 9a and the second portion 9b of the tether 9 when the head h of the passenger is in contact with the airbag cushion 1 to thereby switch the main vent hole 3 to an opened state, an open/close operation of the cover 5 is performed.

For example, when the head h of the passenger is in contact with the airbag cushion 1, a length in a front and rear direction of the airbag cushion 1 is reduced, and the first portion 9a becomes loose and a length thereof shortens. In addition, since the tether 9 configuring the first portion 9a slides toward the second portion 9b as much as the length of the first portion 9a is reduced and the first portion 9a becomes loose in a state in which the second portion 9b becomes loose slides toward, the tensile force provided to the cover 5 by the loosed second portion 9b is released to thereby open the cover 5, thereby opening the main vent hole 3.

Further, as shown in FIG. 1A, FIG. 1B, FIG. 2, FIG. 3A, FIG. 3B, FIG. 4A, FIG. 4B, and FIG. 6, the tether guide 11 may have an edge which is formed in a circular shape, and may be sewed on the inner side of the airbag cushion 1.

That is, an outer line of the tether guide 11 may be entirely sewed and formed on the inner side surface of the airbag cushion 1 with which the head h of the passenger is in contact, force pulling the tether guide 11 by the tensile force which is applied to the tether 9 at the time of deploying the airbag cushion 1, is uniformly dispersed along an outer edge of the tether guide 11.

Therefore, a phenomenon in which a fully deployed shape of the airbag cushion 1 is recessed and distorted in the tether guide 11 portion is removed, such that the head h of the passenger which is in contact with the airbag cushion 1 is stably supported, and it is also possible to prevent the tether guide 11 from being ripped from the airbag cushion 1 or being damaged by a dispersion of load applied to the tether guide 11.

In addition, the outer line of the tether guide 11 is sewed and formed on the airbag cushion 1 along the edge of the tether guide 11 as described above and the tether guides 11 are formed to be symmetrical with each other at both sides of the inner side of the airbag cushion 1, thereby increasing an area of the tether guide 11 which is sewed on the airbag cushion 1.

Therefore, by increasing an area on which the tether 9 slides by the head h contact of the passenger, even in the case in which the head h of the passenger is in contact with the airbag cushion 1 in a state in which it is not at a center of the airbag cushion 1 but is eccentric from therefrom, the tether 9 is smoothly operated, thereby improving open/close performance of the cover 5 and improving performance of the airbag cushion 1.

In the airbag device configured as described above, a rear portion of the airbag cushion 1 having the tether guide 11 mounted therein as shown in FIGS. 1 and 3 is rearward moved toward the head h of the passenger at the time of the initial deploying of the airbag cushion 1 and in this case, the second portion 9b of the tether 9 is pulled along a relative movement of the tether guide 11 and tends to move to the first portion 9a, such that the cover 5 becomes a state in which it closes the main vent hole 3, thereby rapidly deploying the airbag cushion 1.

Particularly, the second portion 9b is supported by a closed guide 13 at a position which is in vicinity of the main vent hole 3 and slides along the side surface of the airbag cushion 1 to be pulled, such that the main vent hole 3 is closed, thereby minimizing loss of the expanding gas which is discharged through the main vent hole 3 to improve initial deploying performance of the airbag cushion 1.

However, in the case in which the auxiliary vent hole 7 is formed to be positioned in the inner side of the main vent hole 3, the expanding gas in the airbag cushion 1 is discharged through the auxiliary vent hole 7, thereby maintaining a predetermined portion of initial deploying performance of the airbag cushion 1 and preventing an excessive pressure increase in the airbag cushion 1 to prevent damage on the airbag cushion 1.

Figure 1B:
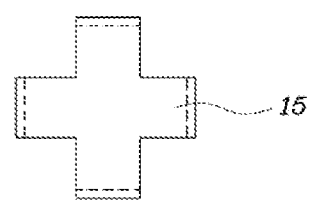
Figure 2:
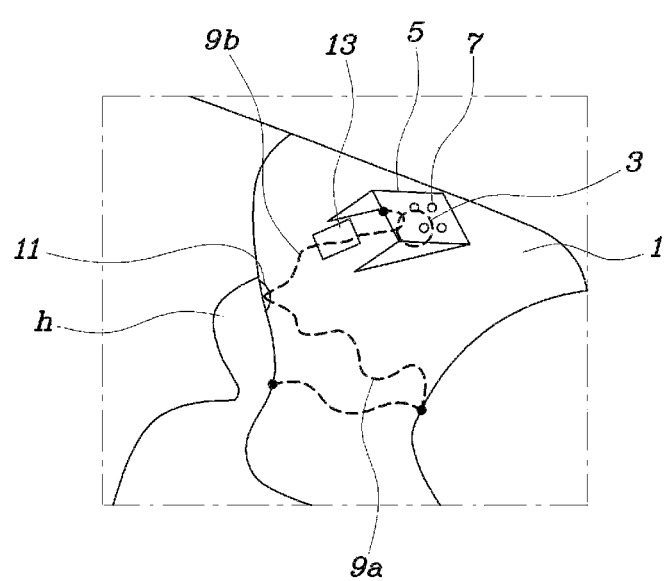
FIG. 2 is a view showing a structure having the main vent hole which is opened at a time of supporting a passenger by an airbag cushion of the exemplary airbag device of FIG. 1A and FIG. 1B.
Figure 3A:
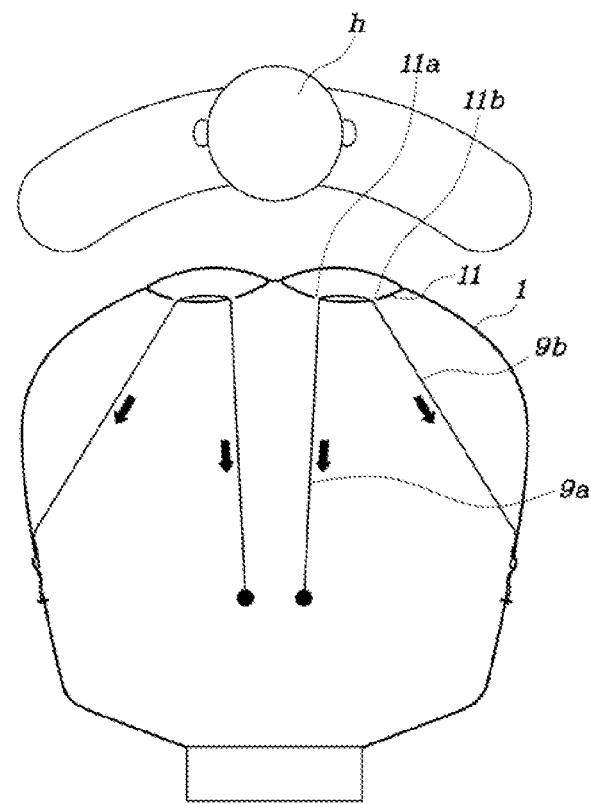
FIG. 3A and FIG. 3B are views showing a shape of the exemplary airbag device of FIG. 1A and FIG. 1B which is viewed from above.
Figure 3B:
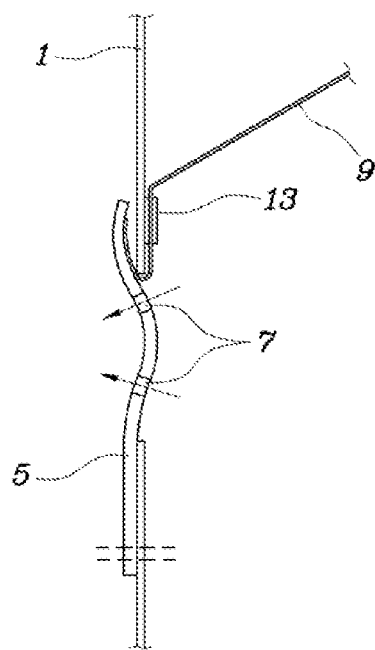

Meanwhile, referring to FIG. 1A, FIG. 1B and FIG. 2, a shape maintaining tether 15 having front and rear ends, and both ends fixed in the airbag cushion 1 and regulating a deployed shape of the airbag cushion 1 may be further provided. Here, the shape maintaining tether 15 is formed in a shape of + character and has front/rear and left/right ends of the shape maintaining tether 15 which are respectively fixed onto front/rear and left/right inner sides of the airbag cushion 1, it may maintain a deployed shape of the airbag cushion 1 in a desired shape at the time of deploying of the airbag cushion 1.

Particularly, a front end portion of the shape maintaining tether 15 may be fixed to the front of the airbag cushion 1 together with the other end portion of the tether 9.

That is, the front end portion of the shape maintaining tether 15 and the other end portion of the tether 9 are fixed to the front of the airbag cushion 1 together with each other, thereby making it possible to reduce the number of processes necessary to fix the tether 9 and the shape maintaining tether 15 to the airbag cushion 1.

Figure 4A:
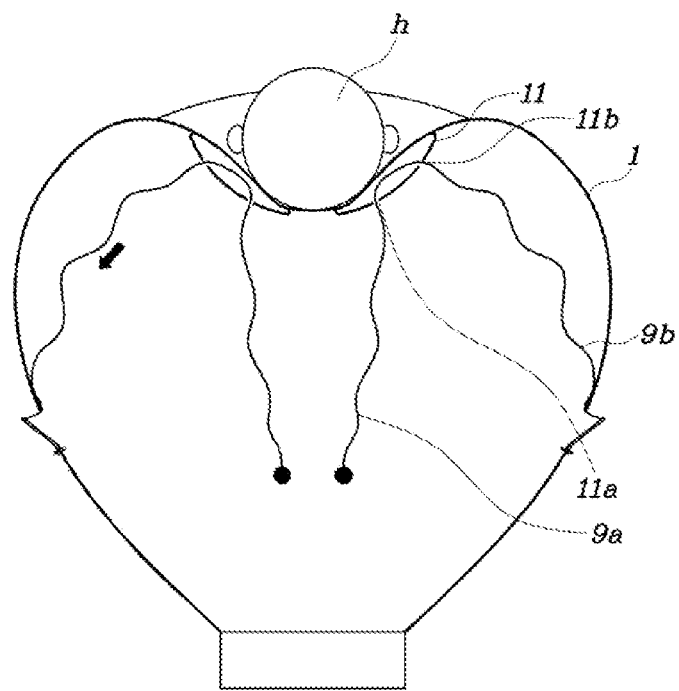
FIG. 4A and FIG. 4B are views showing a shape of the exemplary airbag device of FIG. 2 which is viewed from above.
Figure 4B:
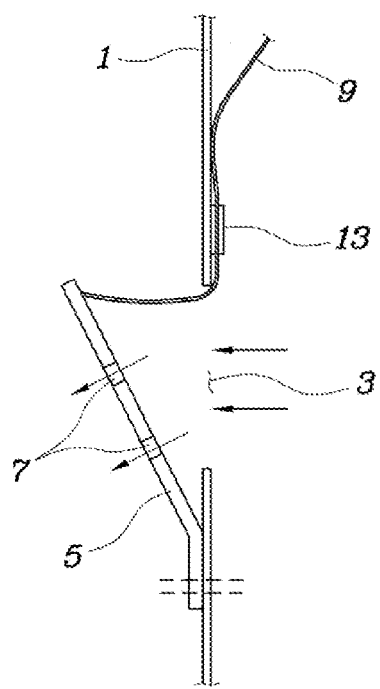

FIG. 2, FIG. 4A and FIG. 4B describe a situation in which the head h of the passenger is loaded on the airbag cushion 1 after the airbag cushion 1 is deployed, and as the head h of the passenger pushes the rear portion of the airbag cushion 1 to the front, the tether guide 11 is moved to the front and the expanding gas applies force pushing the cover 5 to the outside, such that the first portion 9a of the tether 9 is pulled to be moved to the second portion 9b. As a result, the first portion 9a of the tether 9 becomes shorten and the second portion 9b becomes long to allow the cover 5 to open the main vent hole 3 and therefore, the expanding gas in the airbag cushion 1 is discharged through the main vent hole 3, thereby buffering a shock applied from the airbag cushion 1 to the passenger.

Particularly, since the auxiliary vent hole 7 is formed in the cover 5, a portion in which the expanding gas discharged from the airbag cushion 1 is obstructed by the cover 5, is reduced and the expanding gas is more rapidly discharged, thereby improving buffering performance.

Meanwhile, according to the present invention, even in the case in which the passenger is the child, when the head h of the passenger is loaded on the airbag cushion 1 at the time of an initial deploying operation of the airbag cushion 1, the portion having the tether guide 11 mounted therein is moved to the front of the airbag cushion 1 and the first portion 9a of the tether 9 is moved to the second portion 9b, such that the length of the second portion 9b is sufficiently secured to allow the cover 5 to be opened by the expanding gas of the airbag cushion 1 to discharge the expanding gas, thereby making it possible to exhibit appropriate LRD performance to more effectively protect the passengers such as the children.

According to the present invention, the cover blocks the main vent hole at the time of the initial deployment operation of the airbag cushion to thereby allow the airbag cushion to be rapidly deployed and to prevent the pressure in the airbag cushion from being excessively increased by the auxiliary vent hole formed in the cover, and once the passenger is loaded on the airbag cushion, the cover is opened and opens the main vent hole to allow the passenger to be appropriately buffered and rapidly discharge the gas in the airbag cushion even through the auxiliary vent hole, thereby making it possible to secure appropriate buffering performance.

In addition, since the length of the tether is more smoothly changed at the time of deploying the airbag cushion by expanding a space in which the tether is operated between the tether guide and the airbag cushion, the deploying performance of the airbag cushion together with the open/close operation performance of the cover may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag device for a vehicle, comprising:
a main vent hole formed in an airbag cushion and configured to discharge an expanding gas therein;
a cover provided to an outer side of the airbag cushion and configured to switch between a state in which the cover is spaced apart from the main vent hole by a given tensile force to open the main vent hole and a state in which the cover is closely adhered to the main vent hole to close the main vent hole;
a tether configured to have one end portion connected to the cover and another end portion fixed in the airbag cushion and provide the tensile force to the cover through the main vent hole; and
a tether guide configured to have an edge fixed on an inner side of the airbag cushion to form a space between the tether guide and the airbag cushion such that the tether is configured to slide in a state in which the tether passes through the tether guide and is supported,
wherein the tether guide has an edge formed in a circular shape and is sewed on the inner side of the airbag cushion.

2. The airbag device according to claim 1, further comprising a closed guide provided between the main vent hole and the tether guide to support the tether and configured so that the tether passing through the tether guide slides on the inner side of the airbag cushion and passes through the inner side of the airbag cushion.

3. The airbag device according to claim 1, wherein the cover is provided with an auxiliary vent hole to discharge the expanding gas in the airbag cushion, and the auxiliary vent hole is positioned on an inner side or an outer side of the main vent hole in a state in which the cover closes the main vent hole.

4. The airbag device according to claim 1, wherein the cover has a portion adhered to the airbag cushion to enclose the main vent hole and remaining portions which are opened, and is configured together with an outer side of the airbag cushion, to form an outlet having a pocket shape discharging the expanding gas discharged from the main vent hole into an atmosphere.

5. The airbag device according to claim 1, wherein the main vent hole is formed in a side surface of the airbag cushion and the tether guide is installed in an inner side of a portion of the airbag cushion that a head of a passenger is in contact with.

6. The airbag device according to claim 5, wherein an outer surface of the airbag cushion to which the tether guide is fixed is deployed in a state in which the outer surface of the airbag cushion to which the tether guide is fixed protrudes to the passenger as compared to an outer surface of the airbag cushion therearound.

7. The airbag device according to claim 1, wherein the tether includes a first portion connecting a front and a rear of the airbag cushion and a second portion extended to a side of the airbag cushion and connected to the cover, and
the tether guide is provided with a first guide hole through which the first portion of the tether passes and a second guide hole through which the second portion of the tether passes, such that the tether slides while passing through a space between the tether guide and the airbag cushion through the first guide hole and the second guide hole.

8. The airbag device according to claim 7, wherein the other end portion of the tether is fixed on the front of the airbag cushion and a middle end portion of the tether slides while passing through the first guide hole and the second guide hole, such that the tensile force provided to the cover is released by a change in a relative length of the first portion and the second portion of the tether when a head of the passenger is in contact with the airbag cushion to thereby switch the main vent hole to an opened state.

9. The airbag device according to claim 1, further comprising a shape maintaining tether having front and rear ends, and both the front and rear ends fixed in the airbag cushion and regulating a deployed shape of the airbag cushion,
wherein a front end portion of the shape maintaining tether is fixed to a front of the airbag cushion together with the other end portion of the tether.

\* \* \* \* \*